United States Patent [19]

Baker

[11] 4,169,331

[45] Oct. 2, 1979

[54] NET REPLACEMENT UNIT

[76] Inventor: Thomas E. Baker, 4000 Davana Rd., Sherman Oaks, Calif. 91423

[21] Appl. No.: 905,806

[22] Filed: May 15, 1978

[51] Int. Cl.$^2$ .................... A01K 75/00; B01D 35/00
[52] U.S. Cl. ............................... 43/11; 15/1.7; 210/238; 210/471
[58] Field of Search ............... 43/11, 12; 210/232, 210/234, 238, 470, 471; 24/255 R, 138, 137 R; 15/1.7

[56] References Cited

U.S. PATENT DOCUMENTS

| | | | |
|---|---|---|---|
| 2,464,921 | 3/1949 | Chandler | 210/471 X |
| 2,783,573 | 3/1957 | Rau | 43/11 |
| 2,853,195 | 9/1958 | Malcolm | 210/471 |
| 2,867,331 | 1/1959 | Bader | 210/471 |
| 3,220,037 | 11/1965 | Ruhling | 210/471 |
| 3,962,758 | 6/1976 | Knappe | 24/255 R |

Primary Examiner—Nicholas P. Godici
Attorney, Agent, or Firm—Jay H. Quartz

[57] ABSTRACT

For use in combination with a supporting open frame structure adapted for connection to a handle and formed from a material of generally circular cross-section, there is described a net replacement unit which comprises a resiliently deformable, tubular cover and a depending net formed integral therewith. The cover has an inner surface defining an ovate longitudinal bore communicating through a slot coextensive with the bore along its narrow side for reception of the frame therethrough. Additionally, the cover is provided with a plurality of longitudinal ribs coextensive with the bore and extending thereinto from the cover's inner surface in a particular orientation to bias the frame to retain the frame in the cover, yet permit the cover to be readily snapped on and off the frame using only hand pressure when necesssary to replace the net and/or cover.

10 Claims, 6 Drawing Figures

NET REPLACEMENT UNIT

BACKGROUND OF THE INVENTION

This invention relates to "nets" for use in clearing swimming pools, fishing, and the like and more particularly, it relates to replacement "nets" for use in the aforementioned areas.

"Nets" of the type to which this invention relates generally comprise a net, a net-supporting ring or frame, and a sometimes segmented handle to which the frame may be permanently or detachably connected. In some cases, a tubular plastic cover is fitted over the frame to protect it and the net where it loops over the frame from abrasion, impact, etc., to maximize the life of a net.

Both normal and abnormal wear and tear produce holes in nets, thereby requiring their replacement before the end of the useful lives of the devices incorporating such nets. Additionally, the plastic protective covers (which may be designed to provide a projecting edge to facilitate scraping in the case of swimming pool skimmers) wear through so that they then no longer function as required.

If a net is torn or abraded, the usual remedy is to replace the entire net and frame structure (including at least a short length of handle). This can be quite expensive. For example, an average of three nets per commercial swimming pool skimmer need replacement each year. This means that owners of commercial swimming pool cleaning businesses must have a large inventory of replacement units on hand at all times. Thus, such persons have a considerable investment in replacement units.

In an attempt to overcome the foregoing problems relating to net breakage, a replacement net structure has been described in U.S. Pat. No. 2,783,573, issued Mar. 5, 1957 and entitled "Fish Net Having Detachable Ring." Briefly, the described structure comprises a rigid open tubular frame connected to a handle and defining a downwardly-facing continuous groove. A deformable, discontinuous ring supports a net and extends through the rigid frame so that the net extends downwardly through the frame groove. Means are provided to hold the ends of the deformable ring in proximity to each other after it has been threaded through the rigid tubular frame. Although the result is a replacement net which eliminates replacement of the rigid frame and attached handle section, threading of the deformable ring through the rigid frame can be time-consuming and the need to use attachment means to hold the ends of the deformable ring in position increases the number of components and the cost of manufacture. Cost is further increased by the need to thread the deformable rings through their respective associated nets.

Devices which include a protective, deformable rigid ring cover may inherently provide for net replacement. Such a device is described in U.S. Pat. No. 3,220,037, issued Nov. 30, 1965, and entitled "Swimming Pool Cleaning Implement." Described therein is an implement which includes a net-supporting, rigid ring, formed from channel stock, a handle attached to the latter, and a deformable cover of generally rectangular cross-section which defines a slot extending along its underside and which is capable of being snapped over the rigid ring after the free edge of a net has been folded over it to thereby retain the net against the ring. The disadvantage of this approach is that folding the free end of a net over the rigid ring and then holding it in that position while the deformable cover is snapped over it can be very difficult, particularly for a person without special equipment. Additionally, to prevent rotation of the cover about the rigid ring, the described prior art device is limited to implements in which the rigid ring is formed from flat stock.

Other, but unpatented, replacement devices are also presently available. One comprises a rigid frame of circular cross-section having a pair of laterally-extending ends connected together by a plate which is attachable to a handle. In order to hang a net on the frame, the plate must be disconnected therefrom to permit separation of the frame ends so that a net having a continuous loop along its upper edge can be threaded along the frame. After the frame ends have been reconnected at the plate, a deformable, tubular plastic cover defining a slot along one side is slipped over the frame to enclose the upper edge of the net therebetween. The plastic cover has a generally circular cross-section and a pair of outwardly-projecting flanges extending along the cover's length adjacent to the slot so that the cross-section of the cover generally has the shape of Greek letter omega. Replacement of a net on this device requires the use of tools and is time-consuming. Additionally, fitting the cover over the frame can be quite difficult because the cover tends to spiral around the frame. On the other hand, the cover has a tendency to rotate about the frame because it loosely fits the frame so that the protection which it should offer the net is reduced.

Another presently-marketed device utilizes a yoke-shaped frame connectable at the center of its closed end to a handle and having a pair of juxtaposed legs extending forwardly from the closed end. A relatively-rigid ring-shaped cover is formed to be removeably fitted to the frame. That cover has an L-shaped cross-section with one leg of the "L" forming an inner peripheral wall and with the other leg forming a floor (with the cover positioned horizontally). A shortened wall extends parallel to the adjacent floors from each of the side walls to define outwardly-opening grooves therebetween sized to snugly receive the forwardly-projecting legs of the frame. A pair of short arcuate walls extend upwardly from the floor of the cover at its rear corners to define upwardly-opening slots (when the cover is horizontally disposed) to snugly receive the rear corners of the frame. A net is formed integral with the cover so that it is removed with the cover. Replacement of the cover and net is relatively easy. However, because part of the cover is unsupported by the frame, stresses can be applied to the cover during use which can cause it to pop off the frame. On the other hand, it is recommended to use a tool such as a screwdriver to remove the cover from the frame.

A third unit comprises a frame made from channel stock having a continuous groove extending along an inner side thereof for receiving a continuous rib extending inwardly from a side wall of a tubular plastic cover which is generally U-shaped in cross-section and which is sized to be frictionally slipped over the frame after the open edge of a net had been looped over the latter. This cover is limited to use with frames having rectangular cross-sections. Additionally, it is difficult for a person to loop a net over the frame and to then snap the cover thereover.

In view of the present state of the art "net" devices, there is a continuing need for a replaceable net and frame cover which can be easily fitted to a frame by hand pressure, which will not be distorted or removed from the frame by use, and which can be readily removed by hand pressure to replace a net.

SUMMARY OF THE INVENTION

The described invention is embodied in a net replacement unit for use in combination with a ring-type frame of circular cross-section which may be utilized for pool cleaning operations, fishing, etc. The net replacement unit includes, in combination, a resiliently deformable, tubular cover and a net integrally formed therewith along its open edge. The cover defines a bore which is generally egg-shaped in cross section and a coextensive slot through which the bore communicates so that the cover can be fitted over the frame along the latter's length. Projecting inwardly into the bore from the inner surface of the cover are a number of particularly oriented ribs which extend along the length of the cover and which bias the frame when received in the bore.

Several advantages characterize the described net replacement unit. It can be snapped over a frame with finger pressure and it can be removed therefrom with hand pressure, yet it is snugly retained on a frame so that it will not be inadvertently removed from a frame during use. Additionally, the cover is quite firmly mounted on a frame so that its rotation about the frame is minimized, thereby maximizing protection of the net. Forming of the net integral with the cover enables both components to be attached to, and removed from, a frame in one simple step. Thus, the described net replacement unit can be readily utilized by a homeowner or fisherman without tools of any kind and without any particular skills.

The net replacement unit is fully supported by a frame, thereby serving to strengthen the deformable cover. Furthermore, the net replacement device is relatively inexpensive to manufacture so that replacement costs are held to a minimum.

The described invention can be used with frames formed from rod stock, i.e., formed from material having a generally circular cross-section. This permits a frame to be formed from, e.g., spring steel rod rather than aluminum channel stock. Thus, stronger frames can be utilized in conjunction with net replacement units without sacrificing flexibility.

DESCRIPTION OF THE PREFERRED EMBODIMENT

For the purpose of simplifying the description of the net replacement unit or device, the latter is described and illustrated herein in association with a swimming pool skimmer frame. However, it will be understood that it can be used as a component of the other swimming pool cleaning implements, fishing nets, etc.

In general, the net replacement unit comprises a deformable, tubular cover defining a slot along its length so that a frame may be received by the cover. The cover has a plurality of particularly-oriented longitudinal ribs extending inwardly from its inner surface for biasing engagement with the frame when received by the cover. A net is integrally formed with, and depends from, the cover.

As used in this specification and in the claims, references to "upper" and "lower" relate to a horizontally disposed frame, i.e., to a frame lying in a horizontal plane, with a net depending therefrom. Such references are made for ease of description and are not otherwise intended to be limiting.

Figure 1:
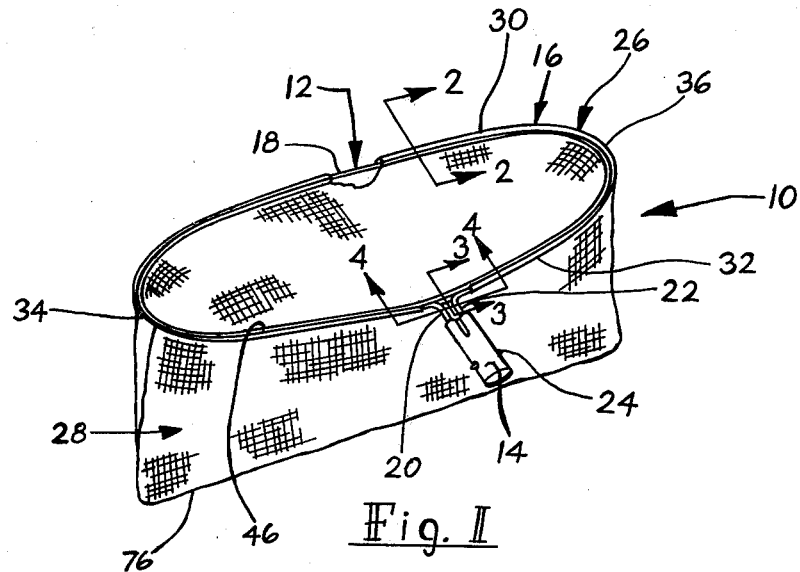
FIG. 1 is a perspective view of the described net replacement unit with the cover component thereof partially cut away to reveal a frame which supports the net replacement device.

Turning now to the Figures for a detailed description of the invention, the numeral 10 (FIG. 1) designates a swimming pool skimmer which comprises an open frame 12, a handle 14, and a net replacement unit 16. The frame 12 comprises a ring portion 18 and a pair of laterally-extending end sections or legs 20,22 which may be connected to the handle 14 in any suitable manner, as for example, by passing a pin 24 through aligned apertures (not shown) in the handle and frame end sections.

Figures 2, 6:
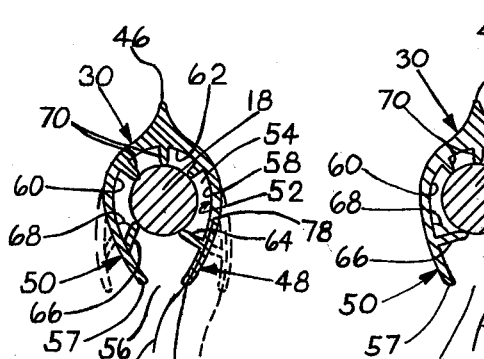
FIG. 2 is an enlarged cross-sectional view of the net replacement unit and frame taken along the line 2—2 of FIG. 1.
FIG. 6 is a view of the net replacement unit and frame similar to that of FIG. 2, but showing another embodiment thereof.
Figure 4:
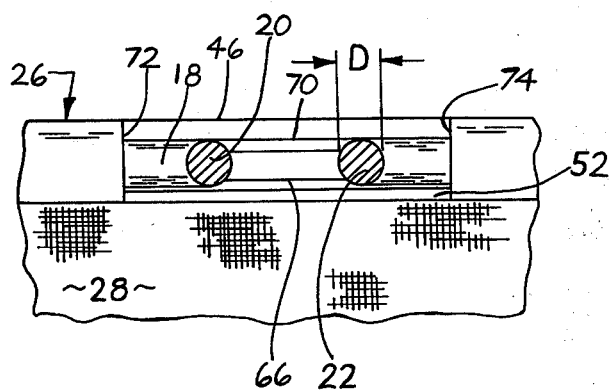
FIG. 4 is an enlarged fragmentary end elevational view of the net replacement unit and frame taken along the line 4—4 of FIG. 1.

The frame 12 has a generally circular cross-section as shown in FIG. 2 and a material diameter "D" (FIG. 4). It is preferably formed from a flexible, resilient metal, such as spring steel, which can be readily bent into a desired shape (such as that shown in FIG. 1), but which will retain its shape during use. The handle 14 may be formed from a strong, lightweight material such as aluminum and have a suitable length.

The net replacement unit 16 comprises a resiliently deformable, tubular cover or sleeve 26 and a net 28 formed integral therewith. The cover 26 is formed from a resilient material which will also permit it to be bent to conform to the configuration of the ring portion 18 of the frame 12. A suitable material is a plastic such as butyrite.

The cover 26 comprises forward and rearward transverse portions 30,32, respectively, integrally interconnected by arcuate side portions 34,36 conforming to corresponding sections of the frame ring 18 with which the cover is made substantially coextensive.

The external cross-sectional shape of the cover 26 may take any desired form although it is preferable (for swimming pool skimmers and the like) to provide the cover with an upwardly-projecting ridge 46 (viewed as in FIG. 1) extending at least along its forward transverse portion 30 for use as a scraper. On the other hand, the internal cross-section of the cover 26 must be egg-shaped or ovate.

Figure 3:
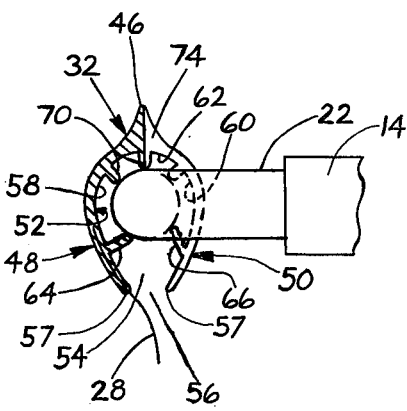
FIG. 3 is an enlarged cross-sectional view of the net replacement unit taken along the line 3—3 of FIG. 1.

As shown in FIG. 2 and 3, the cover 26 comprises a pair of elongated, arcuate side walls 48,50 joined at their upper ends adjacent to the ridge 46 and forming interiorly thereof an inner surface 52 which defines a bore 54 extending the length of the cover 26. The bore 54 has an ovate cross-section with its larger or broader side (as can be seen in FIG. 3) proximal to the ridge 46 and with its smaller or tapered side distal therefrom. The latter side of the bore 54 communicates with the exterior of the cover 26 through a slot 56 opening downwardly (as seen in FIG. 2) through the inner surface 52 and coextensive with the bore. The other pair of ends 57,57 (or free ends) of the side walls 48,50 are thereby separated by the slot 56 and serve to define it. The slot 56 preferably has a width less than the diameter "D" of the frame 12. However, the side walls 48,50 are resiliently expandable so that both the bore 54 and the slot 56 are enlarged by radial expansion of the side walls (as shown in phantom line in FIG. 2) to permit the frame 12 to be pressed through the slot into the bore.

The inner surface 52 of the cover 26 comprises opposing, tapering side wall surfaces 58,60 and an arcuate ceiling surface 62 which interconnects them and which defines the broader end of the ovate bore 54. A pair of elongate ribs 64,66 project inwardly into the bore 54 from the opposing side wall surfaces 58,60 respectively, a spaced distance along the latter surfaces from the cover's free ends 57,57 (or slot 56). The ribs 64,66 may be continuous or discontinuous, but they are substantially coextensive with the bore 54. These ribs 64,66 function to control the ease of entry and exit of the frame 12 into and from the bore 54. Such control is provided by the particular orientation of the ribs 64,66 with respect to the side wall surfaces 58,60, and thus, to the entering and exiting frame 12.

One of the ribs 64 is oriented so that it projects upwardly (when viewed as in FIG. 2) into the bore 54 at an angle of about 85 to 95 degrees with respect to the side wall surface 58 from which it projects.

The other of the entry/exit control ribs 66 projects upwardly into the bore 54 to define an acute angle between it and the side wall surface 60 from which it projects, i.e., between confronting surfaces of the side wall 50 and the rib 66 as indicated by the numeral 68 in FIG. 2. The acute angle 68 may vary between about 90 degrees and about 35 degrees. However, it preferably varies between about 35 degrees and about 55 degrees.

At the upper end of its range, the acute angle 68 may be substantially equal to the angle made by the one rib 64 with respect to the surface 58 from which it projects. In this substantially symmetrical embodiment, (FIG. 6) the ribs 64,66 cooperate adequately to retain the frame 12 in the bore 54, while permitting relatively easily manually-induced entry and exit of the frame therefrom.

On the other hand, when the other rib 66 makes an acute angle 68 of about 35–55 degrees, a superior asymmetrical embodiment (FIG. 2 and 3) is produced. Such superiority is particularly noticeable when it is necessary to remove the frame 12 from the cover 26.

With each embodiment the exiting frame 12 is forced downwardly (as viewed in FIG. 2, 3 and 6) against the ribs 64,66. In the symmetrical embodiment (FIG. 6) it is believed that only a minor percentage of the downward force is utilized as its horizontal component to force the ribs apart. Most of that force is believed absorbed by the ribs 64,66 as its downward component merely results in slightly bending the ribs downwardly. However, in the preferred asymmetrical embodiment (FIG. 2 and 3) it is believed that a significantly higher percentage of the downwardly-exerted force is utilized in forcing the ribs 64,66 apart so that the frame 12 can pass therethrough. The greater horizontal component of this force results from the orientation of the acutely-oriented rib 66 which directs more of the force sideways thereby providing greater sideways thrust to open a passageway for the frame 12.

A similar analysis of the forces developed as the frame 12 enters the bore 54 might also be described, except that the narrowness of the slot vis-à-vis the diameter ("D") of the frame 12 serves to facilitate entry of the frame into the bore so that the orientation of the ribs 64,66 to each other appears to be not as significant during entry of the frame as it is during its exit. That is, because the frame diameter is greater than the width of the slot 56, entry of the frame 12 therein produces an increase in the width of the slot and a corresponding increase in the distance between the ribs 64,66 so that passage of the frame therebetween is thereby facilitated.

The ceiling portion 62 of the cover inner surface 52 may be smooth, but preferably a plurality of spaced elongated ribs 70 project downwardly into the bore therefrom. The generally downwardly-projecting ribs 70 may also be continuous or discontinuous, but are substantially coextensive with the bore 54.

The radial length of the ribs 64,66,70 is such that their ends define in cross-section (as seen in FIG. 2) a circle having a normal diameter (its diameter before the frame 12 is pressed into the cover 26) not greater than the diameter ("D") of the frame 12. Preferably, the defined circle has a diameter slightly less than the diameter of the frame 12 so that, in combination with the resilient material of the frame 12, the ribs 64,66,70 bias the frame to secure it in the cover 26.

If the downwardly-projecting ribs 70 are not present in an embodiment of the net replacement unit 16, then the radial length of the entry/exit control ribs 64,66 will be sufficient to bias or urge the frame 12 into partial circumferential contact with the ceiling 62 which defines the larger end of the bore 54. Additionally, the length of the ribs 64,66 will be such that the ceiling 62 opposite thereto and the ends of those ribs together define a circle having a diameter not greater than that of the frame 12.

Figure 5:
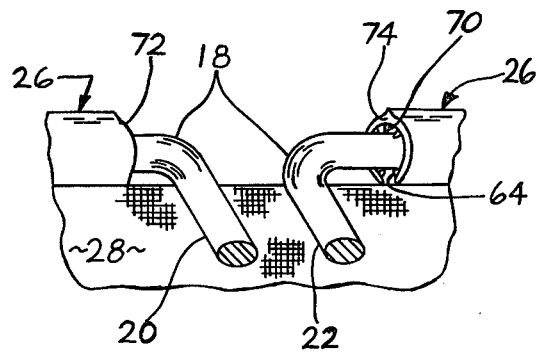
FIG. 5 is an enlarged fragmentary perspective view of the net replacement unit and frame similar to FIG. 4, except for the perspective and showing an alternate structure to that shown in FIG. 4.

An intermediate section of the rearward transverse portion 32 of the cover 26 is removed to permit the frame end sections 20,22 to project through the resulting openings or discontinuity in the cover. Removal of a section of the cover 26 to accommodate the frame end sections 20,22 may involve total removal of that section so that the resulting spaced-apart, opposing ends 72,74 of the cover adjacent to the frame end sections are connected together by only the net 28 extending therebetween as shown in FIG. 5. Alternatively, removal of a section of the cover 26 preferably involves removal of only a section of the outer side wall 50 of the rearward transverse portion 32 of the cover, thereby leaving the ends 38,40 of the cover 26 interconnected both by the net 28 and by the inner side wall 48 of the rearward transverse portion 32 for added strength. In both cases, the frame end sections 20,22 extend rearwardly unobstructed through the resulting opening or discontinuity in the cover 26.

The net 28 may have any desired shape and mesh size. It has a closed, normally lower end 76 and an upper open end defined by an upper continuous edge 78 which is molded into a side wall 48 of the cover 26 (FIGS. 2 and 3) so that the net 28 depends from, and is supported by, the cover 26. The net 28 may be formed from any suitable material such as polypropylene or nylon.

To attach the cover 26 to the frame 12, the cover is caused first to generally overlie the frame with the ends 72,74 of the cover lying adjacent to the frame end sections 20,22. Hand pressure is then applied downwardly against the ridge 46 adjacent to one of the ends 72 to press the cover 26 against the frame 12. This action forces the slot-defining ends 57,57 of the side walls 48,50 apart sufficiently to admit the frame 12. Continued pressure forces a portion of the frame 12 past the entry/exit ribs 64,66 and into the bore 54. Entry of the frame 12 into the bore 54 is indicated by an audible "snap" as the longitudinal side walls 48,50 of the cover 26 on opposite sides of the slot 56 snap back after passage of the frame therebetween. As one section of the frame 12 snaps into the bore 54, hand or finger pressure is applied downwardly against an adjacent section of the cover 26 in a continuous pattern along the length of the cover until the frame ring 18 has been received in the cover bore 54.

Removal of the cover 26 from the frame 12 is substantially the reverse of its attachment thereto, except that finger pressure is applied against the free ends 57,57 of the cover side walls 48,50 along the slot 56 to force those side walls apart and around the frame to permit the latter to escape through the slot 56.

Because the net 28 is formed integral with the cover 26, it is attached to the frame or removed therefrom along with the cover. Thus, in one simple operation, both the net 28 and the cover 26 can be disconnected from, or connected to, the frame 12.

As a specific example, a net replacement unit having the following cover dimensions has been proved to be highly effective when used in combination with a frame having a diameter of 0.188 in. (4.78 mm). The cover which was made from butyrite, had a slot 0.110 in. (2.78 mm) wide and a ceiling surface which formed an arc of a circle having a diameter of 0.245 in. (6.22 mm). The diameter of the circle approximated by the upwardly- and downwardly-directed ribs was about 0.18 in. (4.57 mm). The total length (in a vertical direction) of the bore and slot was about 0.313 in. (7.94 mm). The acutely-oriented rib formed an angle of about 50 degrees with the side wall from which it projected. The two upwardly projecting ribs extended from their respective side wall attachment points about 0.10 in. (2.5 mm.) inwardly from the slot-defining free ends of the cover. The latter also included three downwardly-projecting ribs of somewhat shorter length than the upwardly extending ribs.

I claim:

1. For use with an open ring-type frame formed from a material having a circular cross-section, a net replacement unit which comprises:
    a resiliently-deformable, tubular cover bendable to conform to the shape of said frame, said cover having an interior surface defining a substantially ovate bore coextensive with said cover, said bore having opposing broad and narrow sides in cross-section and communicating through a slot coextensive therewith defined by said cover along said narrow side of said bore, said slot and said bore being sized to receive said frame, first and second ribs substantially coextensive with said bore and having free ends extending upwardly into said bore from opposing surfaces of said interior surface adjacent to said slot, said first rib oriented at an acute angle between about 35 degrees and about 90 degrees with respect to said surface from which it extends, said second rib being oriented at about 85 degrees to about 95 degrees to said surface from which it extends, said first and second ribs extending into said bore a distance sufficient to bias said frame against said interior surface along said broad side of said bore when received by said bore; and
    a net having an open end defined by an edge integral with said cover and depending therefrom.

2. The net replacement unit of claim 1 which further includes a plurality of spaced ribs substantially coextensive with said bore and having free ends extending into said bore from said interior surface defining said broad side of said bore, said first and second ribs acting to urge said frame into engagement with said plurality of spaced ribs.

3. The net replacement unit of claim 2 wherein the free ends of said ribs define substantially a circle having a diameter not greater than the diameter of said frame, whereby said free ends abut against said frame when received by said bore.

4. The net replacement unit of claim 1 wherein said slot has a width less than the diameter of said frame, but wherein said cover is radially expandable to increase said width of said slot to permit said frame to pass therethrough.

5. The net replacement unit of claim 1 wherein said first and second ribs are continuous with said bore.

6. The net replacement unit of claim 1 wherein said edge of said net is continuous, but wherein said cover is at least partially discontinuous along a portion thereof to permit extension of said frame laterally therethrough.

7. The net replacement unit of claim 1 wherein said first rib is oriented at an acute angle between about 35 degrees and about 55 degrees with respect to said surface from which it extends into said bore.

8. For use with an open, ring-type frame having laterally-extending legs and formed from a material having a circular cross-section, a net replacement unit which comprises:
    a resiliently-deformable, tubular cover bendable to conform to the shape of said frame, said cover having an interior surface defining a substantially ovate bore coextensive with said cover and sized to receive said frame, said bore having opposing broad and narrow sides in cross-section and communicating through a slot coextensive therewith defined by said cover along said narrow side of said bore, said slot having a width less than the diameter of said frame material, but operable to receive said frame upon radial expansion of said cover, first and second ribs substantially coextensive with said bore and having free ends extending upwardly into said bore from opposing surfaces of said interior surface a spaced distance from said slot, said first rib being oriented at an acute angle between about 35 degrees and about 55 degrees with respect to said surface from which it extends, said second rib being oriented at an angle between about 85 degrees and about 95 degrees to said surface from which it extends, said first and second ribs extending into said bore a distance sufficient to bias said frame when received by said bore against said interior surface along said broad side of said bore, said cover being at least partially discontinuous along a portion thereof to permit extension of said legs of said frame therethrough; and
    a net having an open end defined by an edge molded into said cover and depending therefrom.

9. The net replacement unit of claim 8 wherein said cover further includes a plurality of radially spaced, elongated ribs substantially coextensive with said bore and extending radially downwardly into said bore from said interior surface along said broad side of said bore, said frame being urged into engagement with said downwardly-extending ribs by said first and second ribs.

10. The net replacement unit of claim 8 wherein said edge defining said open end of said net is continuous.

* * * * *